(12) United States Patent  
Sugahara

(10) Patent No.: US 7,161,692 B2
(45) Date of Patent: Jan. 9, 2007

(54) DATA PROCESSING APPARATUS

(75) Inventor: Yoshinori Sugahara, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 828 days.

(21) Appl. No.: 10/200,125

(22) Filed: Jul. 23, 2002

(65) Prior Publication Data

US 2003/0020939 A1  Jan. 30, 2003

(30) Foreign Application Priority Data

Jul. 25, 2001  (JP)  ............ P2001-224712

(51) Int. Cl.
  *G06F 15/00* (2006.01)
(52) U.S. Cl. .................... 358/1.13; 358/1.15
(58) Field of Classification Search ............... 358/1.15, 358/1.13, 1.18
  See application file for complete search history.

(56) References Cited

U.S. PATENT DOCUMENTS 6,337,744 B1 * 1/2002 Kuroda ................ 358/1.13

FOREIGN PATENT DOCUMENTS

| JP | 10-133832 | 5/1998 |
|---|---|---|
| JP | 11-272432 | 10/1999 |
| JP | 2000-177186 | 6/2000 |

* cited by examiner

*Primary Examiner*—Kimberly Williams
*Assistant Examiner*—Andrew Lam
(74) *Attorney, Agent, or Firm*—Buchanan Ingersoll & Rooney PC

(57) ABSTRACT

A data processing apparatus including a receiving device (26a), a print data converter, a transmitting device (26b), a storage device, a spooler (27), an editor (28), and a controller (21). The data generated by an application is converted to intermediate data. The intermediate data is received by the receiving device. The intermediate data is to be converted into printable print data. The intermediate data is converted into the print data by the converter. The print data is transmitted to the printer by the transmitting device. The intermediate data is spooled in the storage device by the spooler, the intermediate data of the print data being spooled even after the print data is transmitted. The spooled intermediate data is edited by the editor. The editor is controlled by the controller to edit the intermediate data spooled in the storage device after printed according to an instruction of data re-editing by a user. The converter and the transmitting device are controlled by the controller.

17 Claims, 20 Drawing Sheets

| SPOOL DATA LIST | | | |
|---|---|---|---|
| SPOOL TIME | STATE | SOURCE | PC |
| 2001/03/14 09:10 | WAITING | CLIENT | PC1 |
| 2001/03/14 10:20 | WAITING | CLIENT | PC2 |
| 2001/03/14 10:25 | WAITING | CLIENT | PC3 |
| 2001/03/14 10:26 | WAITING | CLIENT | PC1 |
| 2001/03/14 09:02 | PRINTED | CLIENT | PC2 |
| 2001/03/14 09:08 | PRINTED | CLIENT | PC1 |

DELETE 54   EDIT 56   52   53   50

Fig.7A

| STATE / EVENT | 0. PRE-STARTING STATE | 1. IDLE STATE | 2. TEXT EDITING STATE | 3. BITMAP EDITING STATE | 4. LINE EDITING STATE |
|---|---|---|---|---|---|
| EDITOR START-UP | OPEN DIALOG LOAD JOB, DISPLAY FIRST PAGE | NEGLECT | NEGLECT | NEGLECT | NEGLECT |
| RIGHT CLICK ON TEXT | — | DISPLAY EDIT BOX AT TEXT POSITION →2. | NEGLECT | — | — |
| INPUT TEXT | — | NEGLECT | DISPLAY INPUT TEXT IN EDIT BOX | NEGLECT | NEGLECT |
| PUSH ENTER KEY | — | NEGLECT | ERASE EDIT BOX, UPDATE PAGE IMAGE→1. | NEGLECT | NEGLECT |
| LEFT CLICK ON BITMAP | — | DISPLAY RECTANGLE HAVING BITMAP SIZE AT MOUSE POSITION →3. | NEGLECT | — | — |
| MOVE MOUSE | — | NEGLECT | NEGLECT | MOVE UPPER LEFT OF RECTANGLE TO MOUSE POSITION UPDATE PAGE IMAGE →1. | MOVE MOUSE UPDATE PAGE IMAGE →1. |
| LEFT CLICK | — | NEGLECT | NEGLECT | | |

Fig.7B

| EVENT \ STATE | 0. PRE-STARTING STATE | 1. IDLE STATE | 2. TEXT EDITING STATE | 3. BITMAP EDITING STATE | 4. LINE EDITING STATE |
|---|---|---|---|---|---|
| LEFT CLICK AT END OF LINE | — | DISPLAY LINE HAVING MOUSE POSITION AS END WITH DOTTED LINE →4. | NEGLECT | — | — |
| CLICK NEXT PAGE BUTTON | — | PRESENCE OF NEXT PAGE →UPDATE PAGE IMAGE TO NEXT PAGE ABSENCE OF NEXT PAGE →NEGLECT | NEGLECT | NEGLECT | NEGLECT |
| CLICK PREVIOUS PAGE BUTTON | — | PRESENCE OF PREVIOUS PAGE→UPDATE PAGE IMAGE TO PREVIOUS PAGE ABSENCE OF NEXT PAGE→NEGLECT | NEGLECT | — | — |
| CLICK RE-PRINT BUTTON | — | UPDATE JOB TO PRINTER DIALOG CLOSE DIALOG →0. | NEGLECT | — | — |
| CLICK CANCEL BUTTON | — | CLOSE DIALOG →0. | NEGLECT | — | — |

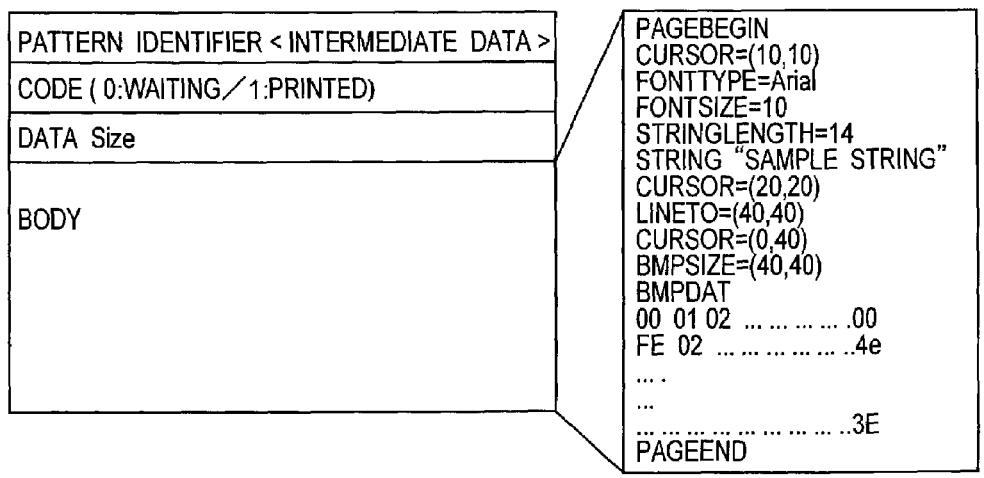

Fig.19

```
SPOOL DATA LIST

SPOOL TIME        STATE    SOURCE PC    EDITABLE/UNEDITABLE
  2001/03/14 09:10  WAITING  CLIENT PC1   EDITABLE
  2001/03/14 10:20  WAITING  CLIENT PC2   UNEDITABLE
  2001/03/14 10:25  WAITING  CLIENT PC3   UNEDITABLE
  2001/03/14 10:26  WAITING  CLIENT PC1   EDITABLE
  2001/03/14 09:02  PRINTED  CLIENT PC2   UNEDITABLE
  2001/03/14 09:08  PRINTED  CLIENT PC1   EDITABLE

[DELETE]  [EDIT]
```

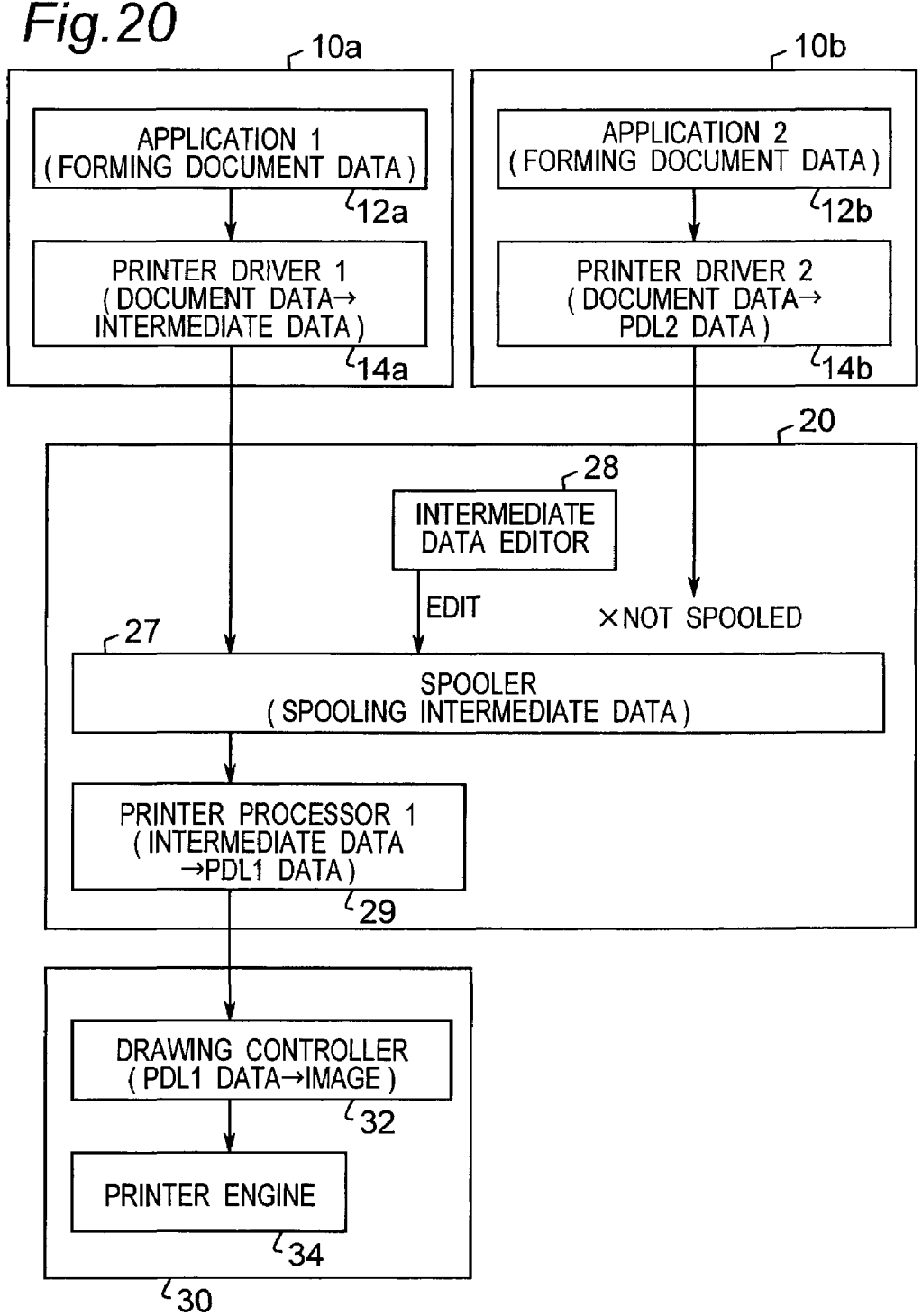

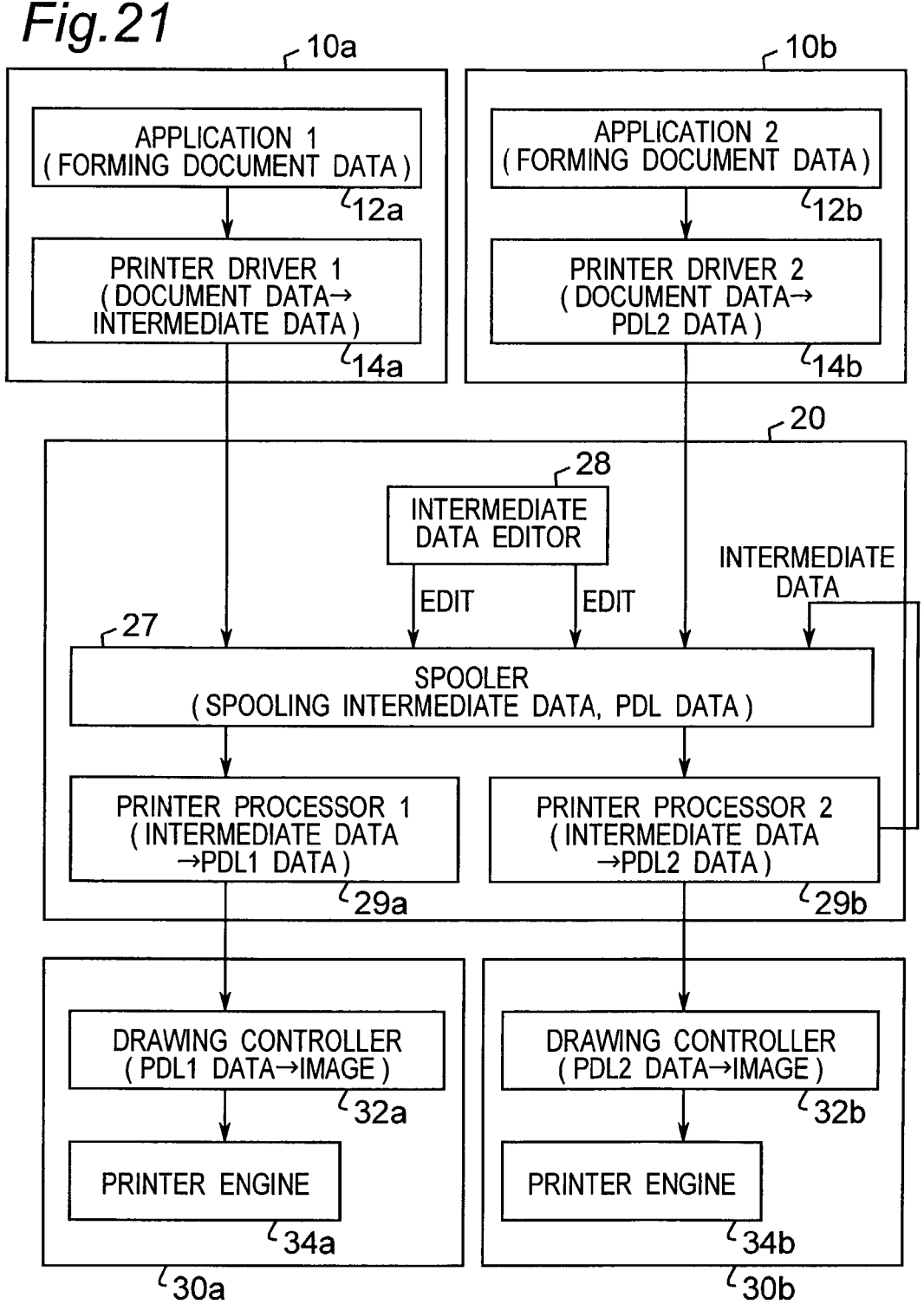

*Fig.22A*

EXAMPLE OF PDL DATA

```
BeginPage
(10,10)SetCursor
(Arial,10)SetFont
(SAMPLE STRING)Text
(20,20)(40,40)Line
(0,40)(40,40)Bmp
00 01 02 ... ... ... .00
FE 02 ... ... ... ...4e
... .
...
... ... ... ... ... ... ..3E
EndPage
```

CONVERSION

*Fig.22B*

| PATTERN IDENTIFIER < INTERMEDIATE DATA > |
|---|
| CODE 0:WAITING |
| DATA Size |
| BODY |

INTERMEDIATE DATA

```
PAGEBEGIN
CURSOR=(10,10)
FONTTYPE=Arial
FONTSIZE=10
STRINGLENGTH=14
STRING "SAMPLE STRING"
CURSOR=(20,20)
LINETO=(40,40)
CURSOR=(0,40)
BMPSIZE=(40,40)
BMPDAT
00 01 02 ... ... ... .00
FE 02 ... ... ... ...4e
... .
...
... ... ... ... ... ... ..3E
PAGEEND
```

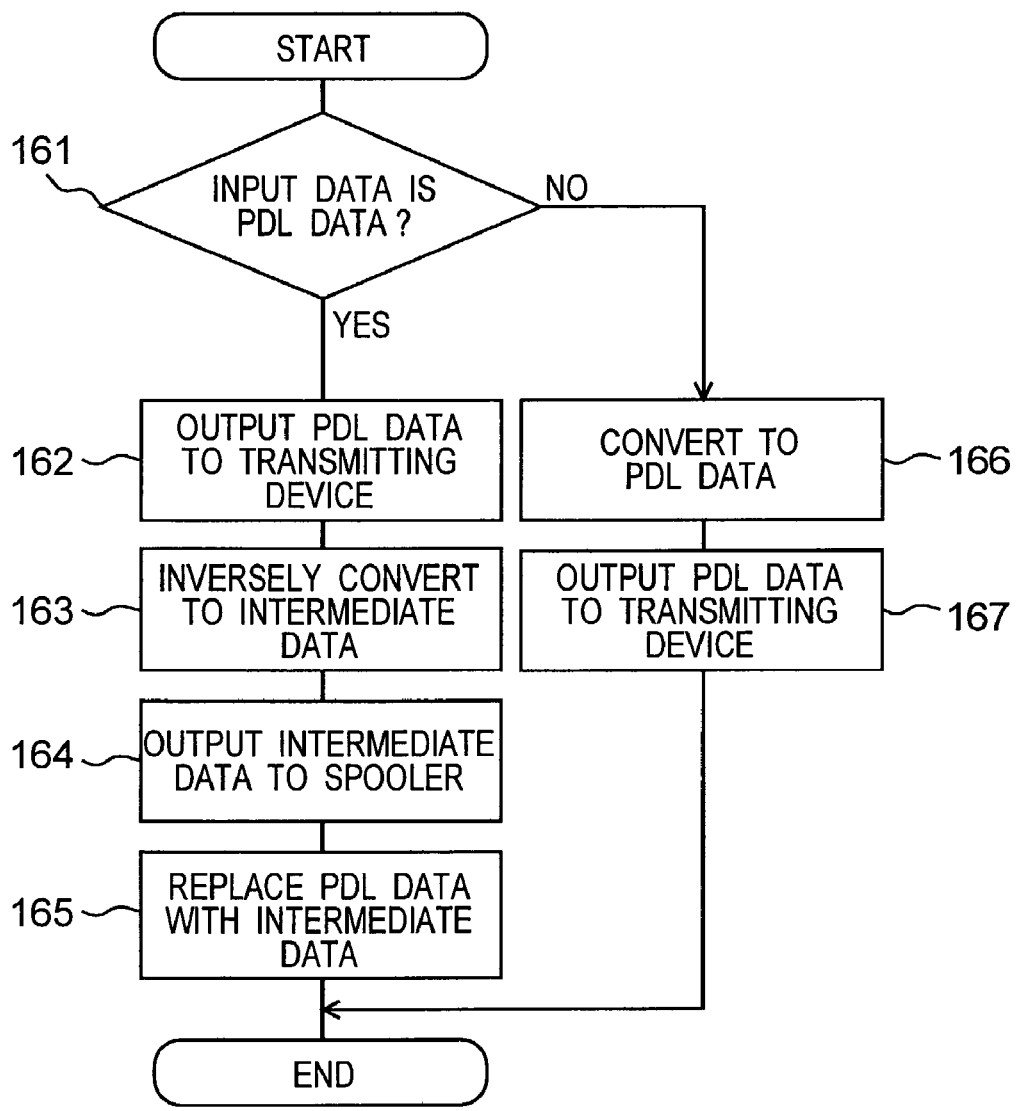

DATA PROCESSING APPARATUS

This application is based on application No. 2001-224712 filed on Japan, the contents of which are hereby incorporated by reference.

BACKGROUND OF THE INVENTION

1. Field of the Invention

The present invention relates to a data processing apparatus, particularly relates to a print system processing data transmitted from an application.

2. Description of the Background Art

When a user tries to print a document, a graphic, or the like generated by an application in a computer, the document, the graphic, or the like are transmitted from the application to a printer in the form of print data. In this case, a print process performed in the printer is very slower than internal processes in the computer. In order to prevent other processes in the computer are delayed by waiting for the print process, the print data is spooled in a storage device called a spooler to perform the print process independently of the internal processes. In the printer, the transmitted print data is converted into a data described by a page description language which can be executed by the printer for a print operation.

In the above mentioned print system, the print data transmitted from the application is held in the spooler before the print operation for the print data is finished, and the print data is cleared from the spooler after the print operation is finished. Therefore, when the same print data is printed again because of a printer error or the like, a user must convert the document data into the print data by the application. Then, a period of time equal to the period of time required for the first print operation is necessary. In order to solve the problem, the printed data is spooled without deletion to print the data again. For example, in a printer driver described in Japanese Laid-Open Patent Publication No.H11-272432, data generated by an application is converted into print data which can be dealt with a printer and the print data is outputted to the printer, while the same data as the print data is filed and stored. Thereafter, the stored print data is printed again according to a re-printing instruction. In a printer control device described in Japanese Laid-Open Patent Publication No.2000-177186, print data transferred to a printer device according to an execution instruction of a re-printing function is stored, and the stored print data is re-printed when the re-printing instruction is received.

However, in the above documents, the same print data is simply spooled to re-print the print data. When the print data converted from a document or the like by an application includes an error, the document must be corrected by use of the application, then the print data must be generated again, and the print data must be transmitted to the printer. In addition, in a local area network (hereinafter referred to as LAN) system obtained by including a client computer (hereinafter referred to as "client") and a server computer (hereinafter referred to as "server"), a printer is generally placed near the server. Therefore, when the client is distant from the server, it is preferable data correction is performed by the server near the printer than by a distant client. In printing performed by mail transfer between the client and the server, it is preferable that data correction can be performed by the server.

SUMMARY OF THE INVENTION

It is an object of the present invention to provide a print system which can perform correction without starting an original application when the printed data includes an error or when print data is desired to be corrected.

In accordance with one aspect of the present invention, there is provided a data processing apparatus including a receiving device, a print data converter, a transmitting device, a storage device, a spooler, an editor, and a controller. The data generated by an application is converted to intermediate data. The intermediate data is received by the receiving device. The intermediate data is to be converted into print data, the print data is to be printed by a printer. The intermediate data is converted into the print data by the print data converter. The print data is transmitted to the printer by the transmitting device. The intermediate data is spooled in the storage device by the spooler, the intermediate data of the print data being spooled even after the print data is transmitted. The intermediate data spooled in the storage device is edited by the editor. The editor is controlled by the controller to edit the intermediate data spooled in the storage device after printed according to an instruction of data re-editing by a user. The converter is controlled by the controller to convert the edited intermediate data to the print data. The transmitting device is controlled by the controller to retransmit the print data to the printer.

In another aspect of the present invention, there is provided a print system including a receiving device, a print data converter, a drawing controller, a printer engine, a storage device, a spooler, an editor, and a controller. The data generated by an application is converted to intermediate data. The intermediate data is received by the receiving device. The intermediate data is to be converted into print data, the print data is to be printed by a printer. The intermediate data is converted into the print data by the print data converter. The print data is converted into a bitmap image by the drawing controller. A print process is performed on the basis of the bitmap image by the printer engine. The intermediate data is spooled in the storage device by the spooler, the intermediate data of the print data being spooled even after the print data is transmitted. The intermediate data spooled in the storage device is edited by the editor. The editor is controlled by the controller to edit the intermediate data spooled in the storage device after printed according to a user's instruction of data re-editing. The controller also controls the drawing controller and the print engine to re-print the edited intermediate data.

In a further aspect of the present invention, there is provided a data processing method including the steps of:

(a) receiving intermediate data which is converted from data generated by an application, the intermediate data is to be converted into print data, the print data is to be printed by a printer;

(b) converting the intermediate data into print data;

(c) transmitting the print data to the printer;

(d) spooling the intermediate data in a storage device, the intermediate data of the print data being spooled even after the print data is transmitted;

(e) starting an editor editing the intermediate data spooled in the storage device according to a user's instruction of data editing; and (f) re-transmitting the print data re-converted from the edited intermediate data to the printer.

BRIEF DESCRIPTION OF THE DRAWINGS

The present invention will become readily understood from the following description of preferred embodiments thereof made with reference to the accompanying drawings, in which like parts are designated by like reference numeral and in which:

FIGS. 7A and 7B are state transition diagrams regarding with the intermediate data editing by the editor in FIG. 6;

FIG. 13 is an example of a diagram of screen of a spool data list showing the state of intermediate data edited by an intermediate data editor;

FIG. 14 is an example of a diagram of intermediate data edited by the intermediate data editor;

FIG. 19 is an example of a diagram of a screen of a spool data list obtained by the data processing system according to fourth embodiment of the present invention;

FIG. 20 is a block diagram showing the operation of a data processing system according to fifth embodiment of the present invention;

FIG. 21 is a block diagram showing the operation of a data processing system according to sixth embodiment of the present invention;

FIG. 22A is an example of a diagram showing PDL data in the data processing system according to the sixth embodiment of the present invention;

FIG. 22B is an example of a diagram of an intermediate data converted from the PDL data in FIG. 22A;

FIG. 24 is a flow chart of the data processing system according to sixth embodiment of the present invention.

DETAILED DESCRIPTION OF THE PREFERRED EMBODIMENTS

Figure 1:
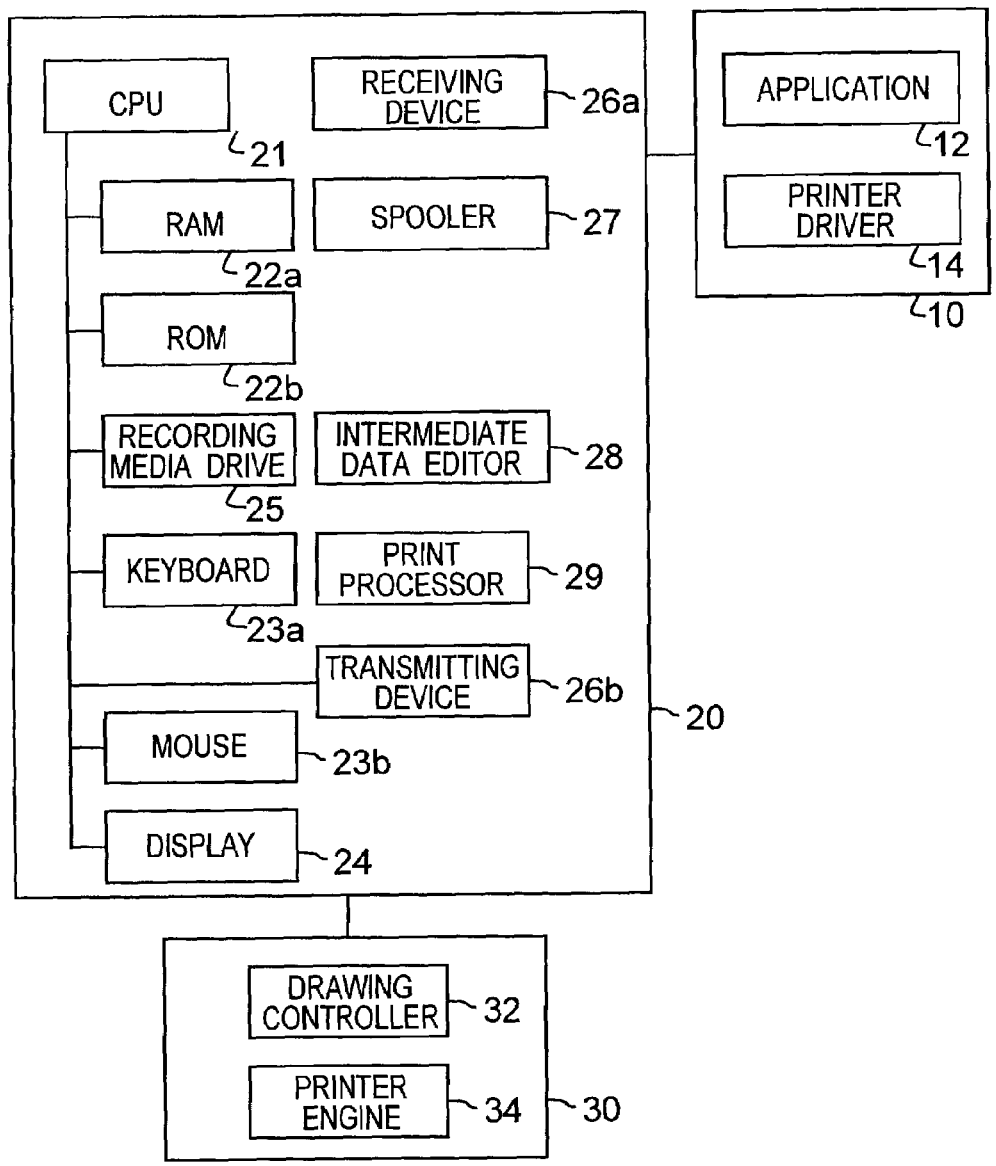
FIG. 1 is a block diagram of a data processing system according to the first embodiment of the present invention.

A print system according to first embodiment of the present invention will be described below. In this print system, as shown in the block diagram in FIG. 1, client computers (hereinafter referred to as "client") 10 and a server computer (hereinafter referred to as "server") 20 are connected to each other, and a printer 30 is connected to the server 20. The respective components thereof will be described below. The client 10 includes an application 12 generating a document or the like and a printer driver 14 performing data conversion printing the document or the like with the printer 30. The server 20 includes a central processing unit (hereinafter referred to as CPU) 21, a random access memory (hereinafter referred to as RAM) 22a, a read only memory (hereinafter referred to as ROM) 22b, a keyboard 23a, a mouse 23b, a display 24, a recording medium drive 25 driving a recording medium such as a flexible disk, a hard disk, or a CD-R and the like, a receiving device 26a, and a transmitting device 26b. In addition, this server 20 includes a spooler 27 spooling data transmitted from the clients, an intermediate data editor 28 editing intermediate data spooled in the spooler 27, and a print processor 29 converting the intermediate data into page description language (hereinafter referred to as PDL) data described by PDL matched to the printer. It is noted that the above functional components 27, 28, 29 of the server 20 are executed by computer programs. The printer 30 includes a drawing controller 32 converting the PDL data output from the server 20 into a bitmap image, and a printer engine 34 performing printing on the basis of the converted bitmap image.

The server 20 in this print system is characterized by including a spooler 27 for spooling intermediate data which has not yet been converted into print data and the intermediate data editor 28 editing the intermediate data. In this manner, when the print data has an error, without starting the application 12 in the client 10 at which the print data is generated, the printed intermediate data spooled in the spooler 27 on the server 20 is edited to correct the error of the intermediate data, so that re-printing can be rapidly performed. The intermediate data to be edited is not limited to the intermediate data that had been converted to be printed, and any intermediate data which is waiting to be printed and which is spooled in the spooler 27 can be directed to be edited.

Figure 2:
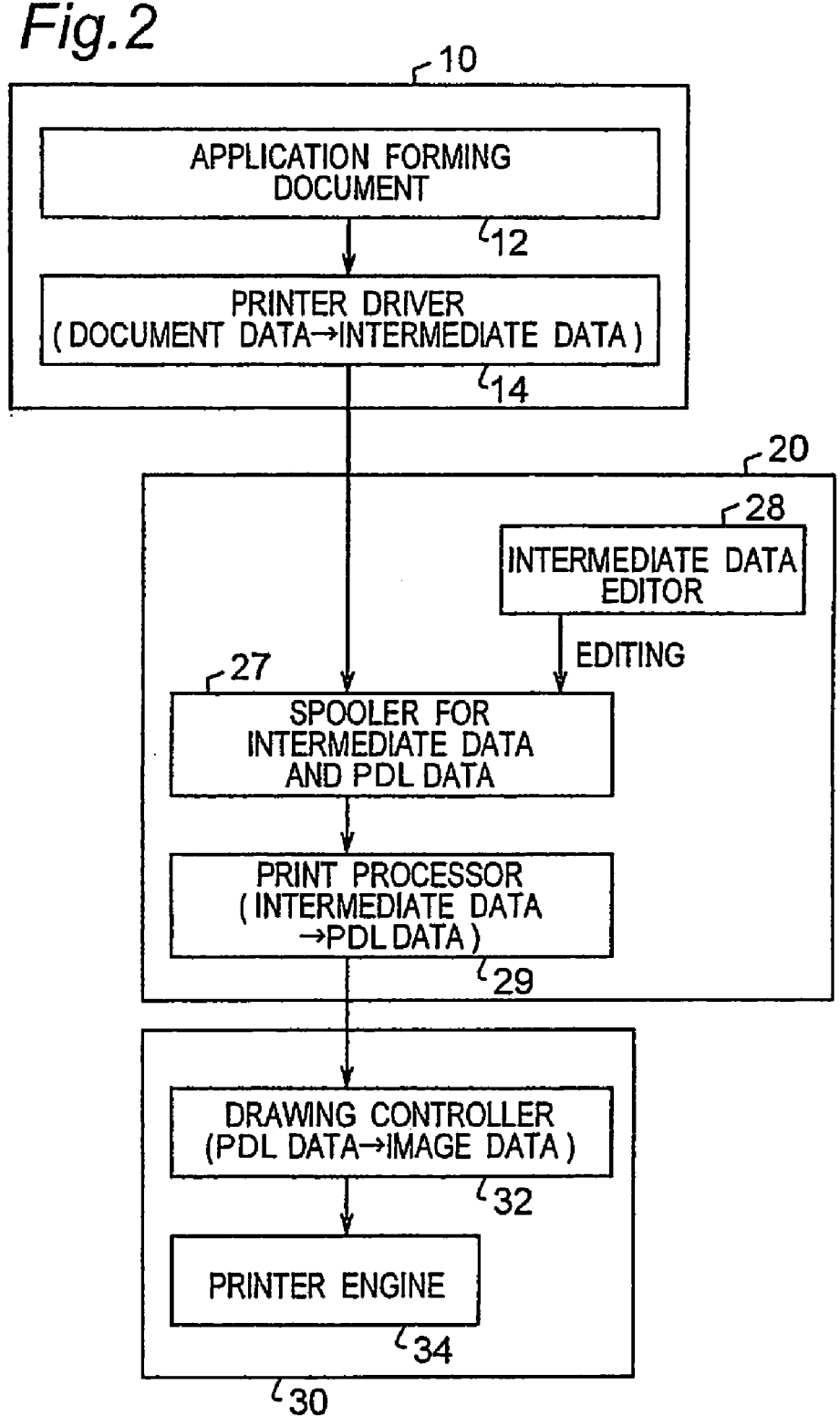
FIG. 2 is a block diagram showing the operation of the data processing system according to the first embodiment of the present invention.

In this print system, document data or the like generated by the application 12 of the client 10 is spooled by the server 20 and printed by the printer 30, therefore the flow of the procedures will be described below with reference to FIG. 2.

(1) A document or the like generated by the client 10 is converted into intermediate data, and the intermediate data is output to the server 20.

(2) In the server 20, intermediate data are spooled in the spooler 27, and are sequentially sent to the print processor 29 in chronological order of spooling. In the print processor 29, the intermediate data is converted into PDL data serving as print data described by a page description language matched to the printer 30. The PDL data is output to the printer 30.

(3) In the printer 30, a bitmap image is generated from the PDL data and is printed.

With respect to the above-described each procedures, in the client 10, the server 20, and the printer 30, the procedures will be described below respectively. First, in the client 10, document data or the like generated by the application is output to the server 20 by the following procedures.

(1) First, document data or the like is generated by the application 12.

(2) Then, the document data or the like is converted into intermediate data described by an intermediate language by the printer driver 14 and the intermediate data is output to the server 20.

Then, in the server 20, data from the client 10 is spooled by the following procedures and is output to the printer 30.

(1) First, the intermediate data sent from the client 10 is spooled in the spooler 27. At this time, a code of "printer waiting" is added to the intermediate data as a code of a print state.

(2) Then, in the spooler 27, intermediate data which is spooled older, that is having long spool time, and which has the code of "printer waiting" is output to the print processor 29. At this time, the code of "printer waiting" is replaced with a code of "printed" without deleting the output intermediate data, and the intermediate data is spooled just as it is.

(3) And then, in the print processor 29, the intermediate data is converted into PDL data serving as print data described by a page description language, and the PDL data is output to the printer 30.

And, in the printer 30, the PDL data serving as the print data is printed by the following procedures.

(1) First, the PDL data is converted into a bitmap image by the drawing controller 32.

(2) Then, a print process is performed by the printer engine 34 on the basis of the bitmap image.

Consequently, the document data or the like generated by the client 10 can be spooled in the server 20 and printed by the printer 30.

Figure 3:
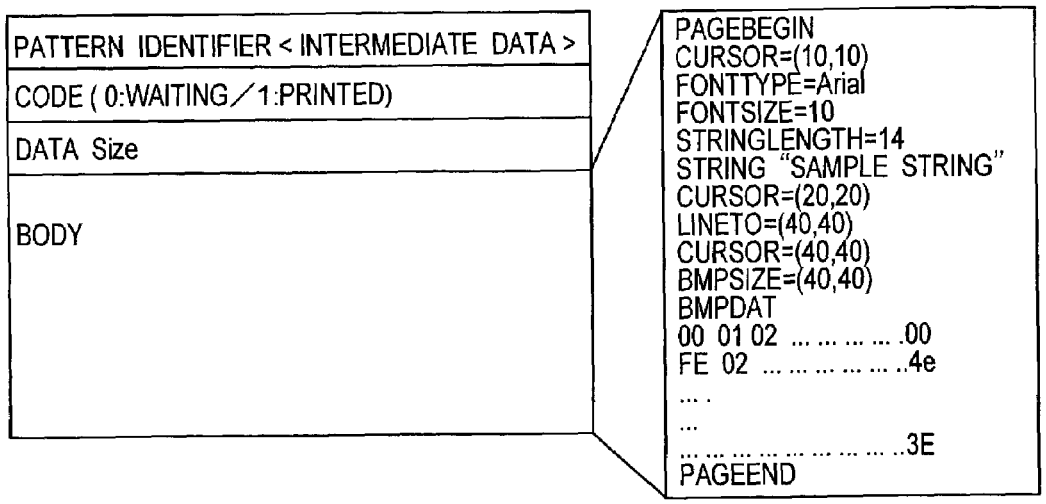
FIG. 3 is an example of a diagram of intermediate data in the data processing system according to the first embodiment of the present invention.
Figure 4:
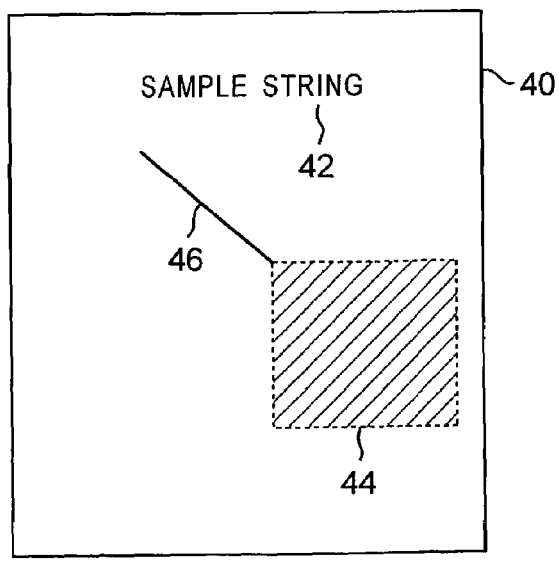
FIG. 4 is an example of a diagram of a screen showing a print image of the intermediate data in FIG. 3.

The intermediate data will be described by using the example of the intermediate data in FIG. 3 and the print image in FIG. 4. FIG. 4 is the print image of the intermediate data in FIG. 3. The intermediate data, in the example shown in FIG. 3, consists of a pattern identifier representing that data is intermediate data, a code representing "printer waiting" or "printed", a data size, and an intermediate data body. Also, in the body, a part to be text data 42, a part to be bitmap data 44, and a part to be line data 46 are described by the print image in FIG. 4. The intermediate data displayed like a text file in FIG. 3. But, in fact, the intermediate data is a binary file.

Figures 5, 6:
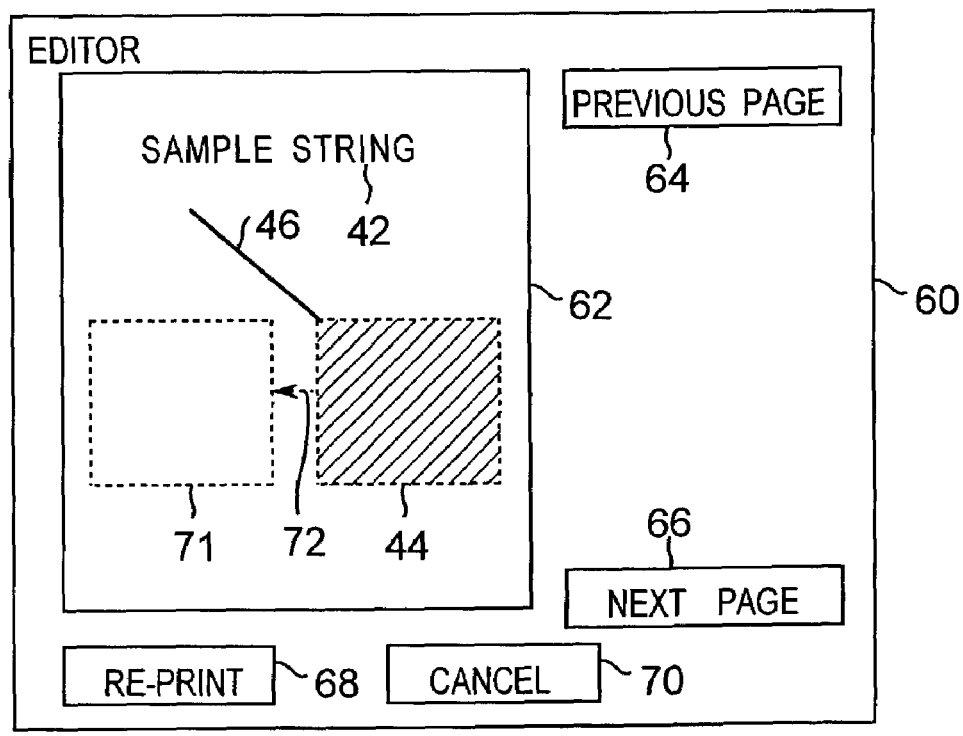
FIG. 5 is an example of a diagram of a selection screen of intermediate data for editing from intermediate data spooled in the data processing system according to the first embodiment of the present invention.
FIG. 6 is an example of a diagram of an intermediate data editing screen obtained by an intermediate data editor of the data processing system according to the first embodiment of the present invention.

In the print system, when the printed document data or the like has an error, without starting the application 12 of the client 10 at which the data is generated, the printed intermediate data spooled in the spooler 27 is edited near the server. Selection of intermediate data to be edited will be described first. When the intermediate data editor 28 is started in the server 20, as shown in FIG. 5, a spool data list 52 selecting intermediate data to be edited is displayed on screen 50. On the screen 50, the data list 52 which shows spool times, states, source computers, and the like, a delete button 54, and an editing button 56 are displayed. Selection of the intermediate data 53 to be edited can be performed such that the intermediate data 53 is selected by the mouse 23b and fixed by the editing button 56.

Then, the function of the intermediate data editor 28 will be described. In the screen of the intermediate data editor 28, as shown in an example of the screen in FIG. 6, an area 62 in which a main page is displayed, a previous page button 64, a next page button 66, a re-print button 68, a cancel button 70, and the like are arranged. In the editor 28, transition from an idle state in FIG. 6 to states such as a text data editing state, a bitmap data editing state, and a line data editing state can be performed. For example, as shown in the state transition diagrams in FIGS. 7A and 7B, by various event selections of interfaces such as a mouse or a keyboard or the like, transition to the respective states can be performed.

Figure 8:
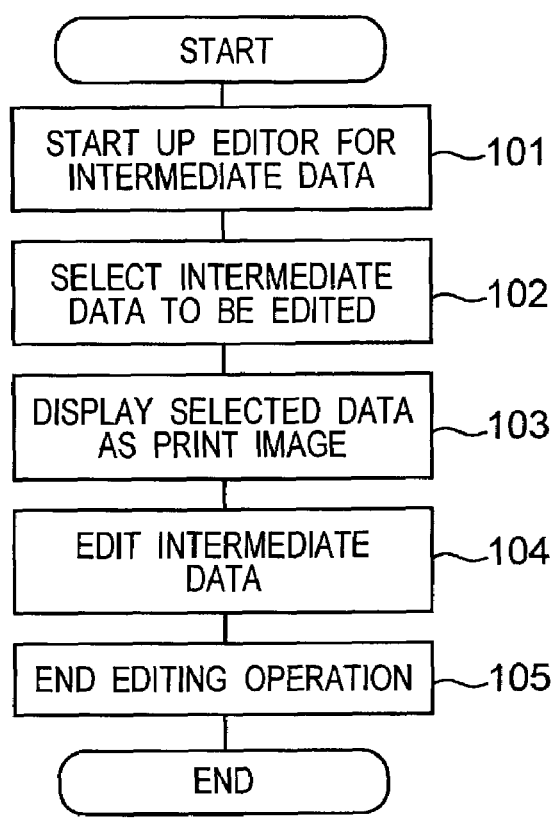
FIG. 8 is a flow chart of a data processing method according to first embodiment of the present invention.

In addition, an editing operation of intermediate data by the intermediate data editor 28 can be performed by the following procedures shown in the flow chart in FIG. 8.

(1) First, the editor 28 serving as an intermediate editing device is started (101). In this case, the editor 28 is realized by executing a program on the server 20 which is a computer.

(2) Then, selection of intermediate data to be edited by a user from data spooled in the spooler 27 is acquired (102).

(3) The selected intermediate image is displayed on the screen as a print image (103).

(4) And, the intermediate data is edited on the editor 28 (104).

(5) Thereafter, the editing operation of the intermediate data is ended (105).

Figure 9:
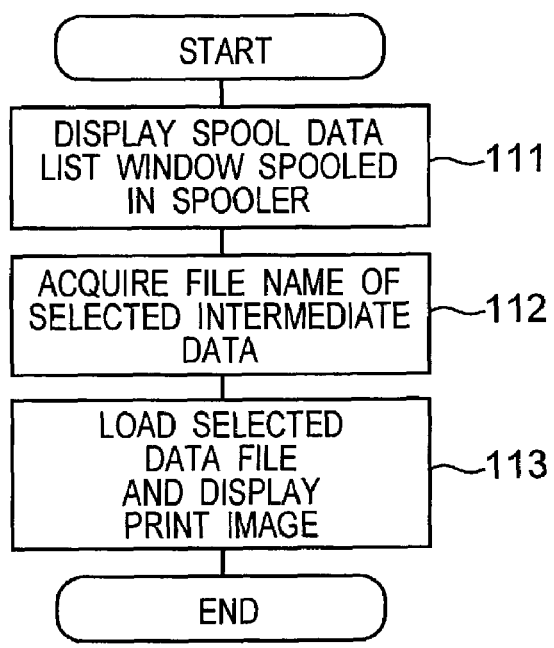
FIG. 9 is a flow chart of a procedure 102 in FIG. 8, showing a selection procedure of intermediate data for editing.

Furthermore, the above procedures will be described below. First, the procedure 102 which selects intermediate data to be edited by the intermediate data editor 28 will be described by using FIG. 9. The intermediate data to be edited may be selected when the editor is started or after the editor is started.

(1) First, the window of a spool data list spooled in the spooler 27 is displayed (111).

(2) Then, the file name of the intermediate data selected by a user is acquired (112).

(3) And, the selected intermediate data file is loaded, and the print image of the intermediate data file is displayed on the screen (113).

Next, the procedure 104 for editing intermediate data will be described. The editing operation of the intermediate data is constituted by three editing operations, i.e., a text data editing operation for editing data on a text data, a bitmap editing operation for editing data on a bitmap data, and a line data editing operation for editing data on a line. These editing operations can edit the text data 42, the bitmap data 44, and the line data 46 of the print image 62 shown in an editor screen 60 in FIG. 6, respectively. The three editing procedures will be described below.

Figure 10:
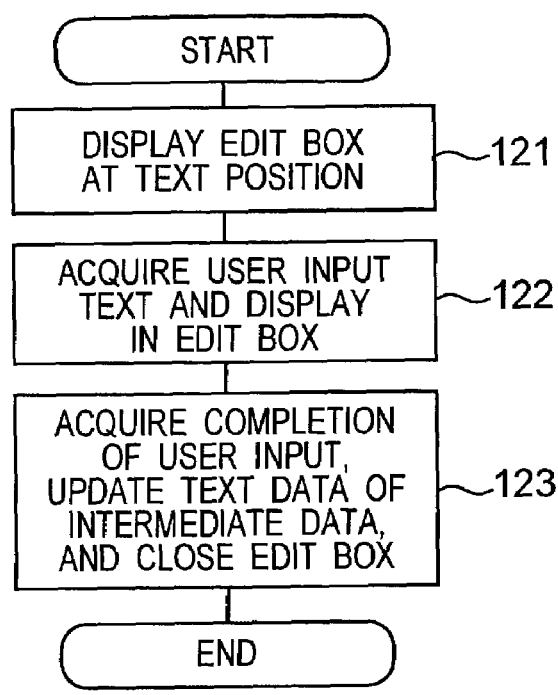
FIG. 10 is a flow chart of a procedure 104 in FIG. 8, showing a text data editing procedure for editing text data in an intermediate data editing operation.

First the text data editing operation performed by the editor 28 will be described below by using the flow chart in FIG. 10.

(1) First, on the print image 62 on the editor screen 60, when mouse cursor is positioned to a text position and right button is clicked by user, an edit box for a text editing operation is displayed at the text position (121).

(2) Then, a text input from the keyboard 23a is acquired and displayed on the edit box (122).

(3) And then, the end of the text is acquired, the text data of the intermediate data is updated, and the edit box is closed (123). The intermediate data may be updated when all the editing operations in the intermediate data editor 28 are completed. In this case, the edited intermediate data is generated in a temporary file or the like.

The text data editing operation of the intermediate data can be performed by the above procedures.

Figure 11:
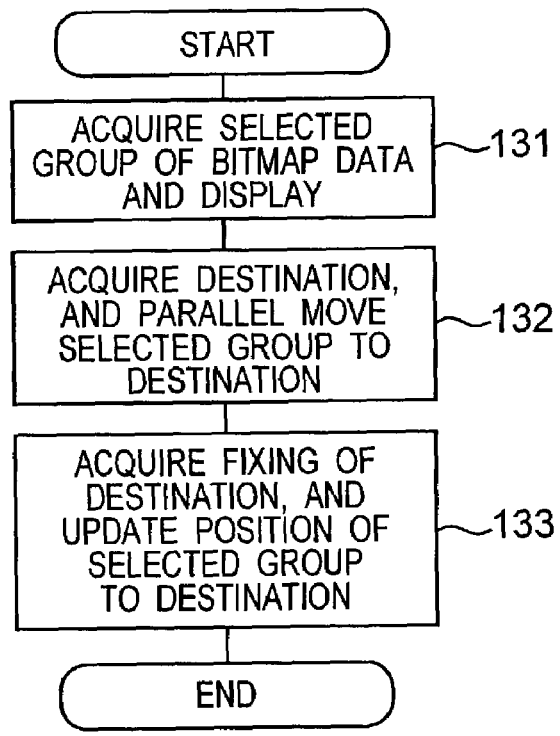
FIG. 11 is a flow chart of the procedure 104 in FIG. 8, showing a bitmap data editing procedure for editing bitmap data in the intermediate data editing operation.

Next, of the bitmap data editing operation performed by the intermediate data editor 28, an editing operation regarding with a position will be described below by using the flow chart shown in FIG. 11.

(1) First, on the print image 62 on the editor screen 60, when mouse cursor is positioned to a bitmap data position and left button of the mouse 23b is clicked by user, the bitmap data is selected. One selected group of bitmap data is acquired, and the area of the group is displayed on the screen (131).

(2) Then, when the mouse cursor is moved while the left button of the mouse 23b is clicked, movement of the mouse cursor is acquired. For example, in FIG. 6, when the mouse cursor is moved in a direction indicated by an arrow 72, the selected group of bitmap data is parallel moved to a destination 71 of the mouse cursor indicated by a dotted frame in FIG. 6 (132).

(3) And then, when the left button of the mouse 23b is clicked, the destination of the selected group of bitmap data is fixed, and the destination is acquired. In the intermediate data, the position of the selected group of bitmap data is updated to the destination (133). The intermediate data may be updated when all the editing operations in the editor 28 are completed. In this case, the edited intermediate data are generated in a temporary file or the like.

Figure 12:
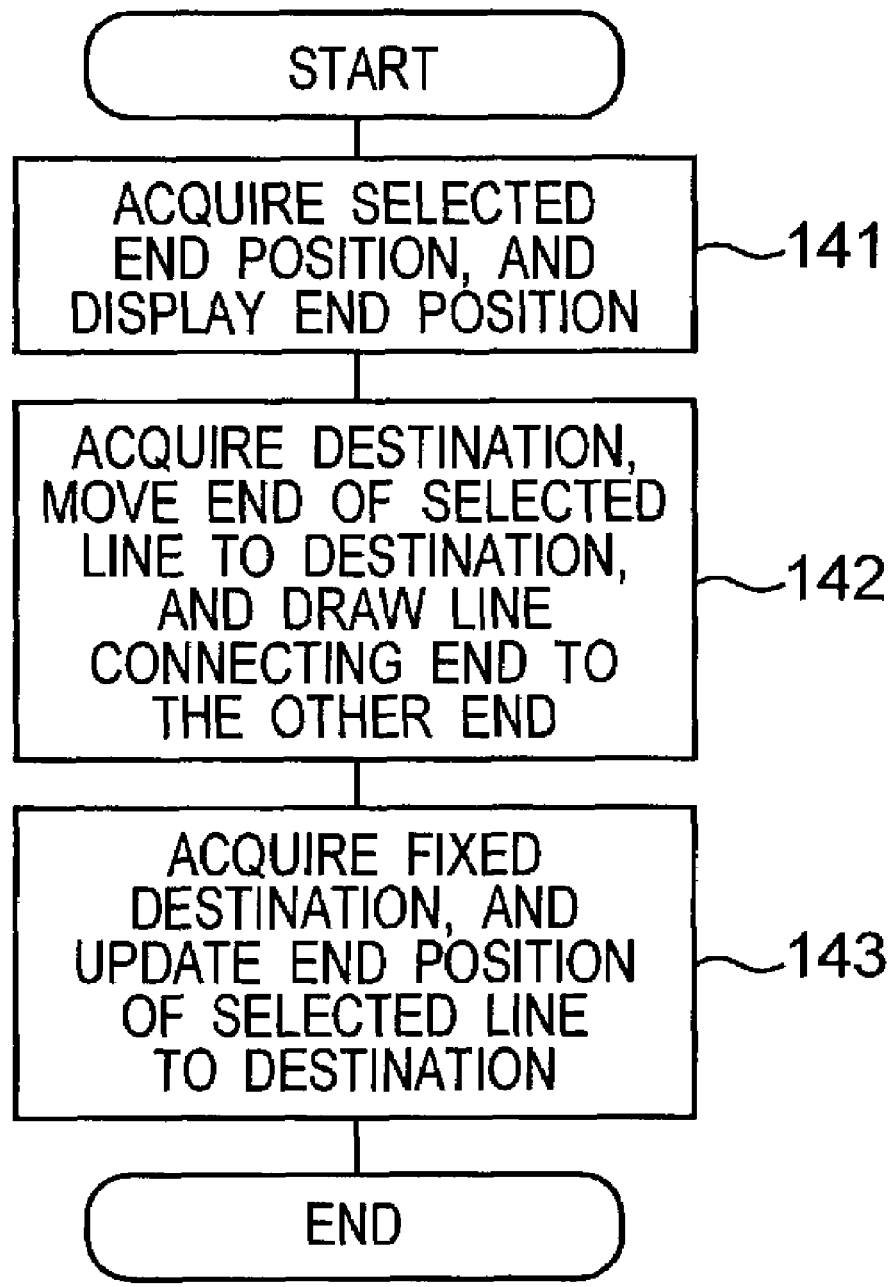
FIG. 12 is a flow chart of the procedure 104 in FIG. 8, showing a line data editing operation for editing line data in the intermediate data editing operation.

In addition, regarding with the line data editing operation by the editor 28, an editing operation regarding with the position of a line will be described with reference to the flow chart in FIG. 12.

(1) First, on the print image 62 on the editor screen 60, when the mouse cursor is positioned to one end position of the two end positions of the line data, and when the left button of the mouse is clicked, it is considered that the end position is selected. The selected end position is acquired, and the end is displayed on the screen (141).

(2) Then, when the mouse cursor is moved while the left button of the mouse 23b is clicked, movement of the mouse cursor is acquired. The mouse cursor is moved to the destination of the mouse cursor, and a line which connects the end to which the cursor is moved and the other end to each other is drawn (142).

(3) And then, when the left button of the mouse 23b is clicked, the destination of the selected end is fixed. Next, the fixed destination of the mouse cursor is acquired, and the selected end position of the line is updated to the acquired destination (143). The intermediate data may be updated when all the editing operations in the editor 28 are completed. In this case, the edited intermediate data are generated in a temporary file or the like.

Furthermore, in the procedure 105 for ending the editing operation of intermediate data, the re-print button 68 on the editor screen 60 in FIG. 6 is clicked, so that the editing operation of the intermediate data is ended. In the intermediate data the editing operation is ended, then the code representing "printed" is replaced with the code representing "printer waiting". In this manner, edited intermediate data 55, as shown in FIG. 13, is rapidly re-printed because the data 55 having the code "printer waiting" is spooled while the spool time of the data is kept old. Also, a bitmap data part of the edited intermediate data is corrected as in the intermediate data in FIG. 14.

With the above procedures, the intermediate data is editable by the intermediate data editor 28. Also, the procedures for editing the intermediate data can be realized by a program including the above procedures as steps. In addition, the program can be stored in a computer readable recording medium.

As the computer readable recording medium, a magnetic recording medium such as a flexible disk or a hard disk or the like, an optical recording medium such as a compact disc read only memory (CD-ROM), a compact disc-recordable (CD-R), a compact disc rewritable (CD-RW), or a digital versatile disc (DVD) or the like, a magneto-optical recording medium such as a magneto-optical (MO) disc or a mini-disc (MD) or the like, or a semiconductor recording medium such as an electrically erasable and programmable read only memory (EEPROM), a dynamic random access memory (DRAM), or a flash memory or the like can be used. Also, programs stored in these recording media are read by recording medium reading device and executed on a computer.

Figure 15:
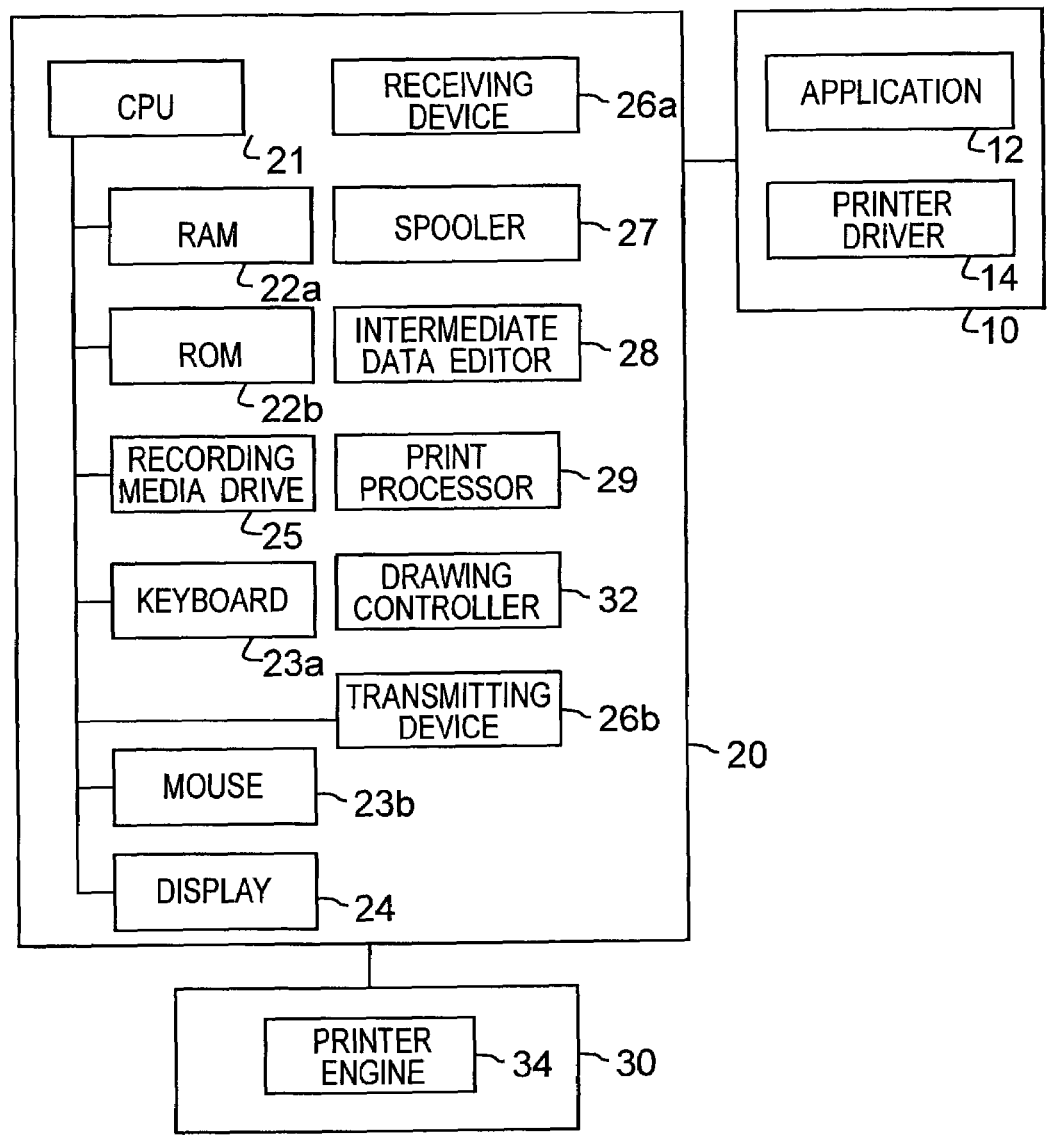
FIG. 15 is a block diagram of a data processing system according to second embodiment of the present invention.

A print system according to second embodiment of the present invention will be described. A server 20 in the print system is compared with the server of the print system according to the first embodiment, as shown in the block diagram in FIG. 15. As shown in the block diagram in FIG. 15, the server 20 according to second embodiment is different from the server according to the first embodiment in that the server 20 has a drawing controller 32 converting PDL data into a bitmap image. In this manner, when the server has the drawing controller 32 which is a component of the printer 30, so that a load on the printer 30 can be reduced.

Figure 16:
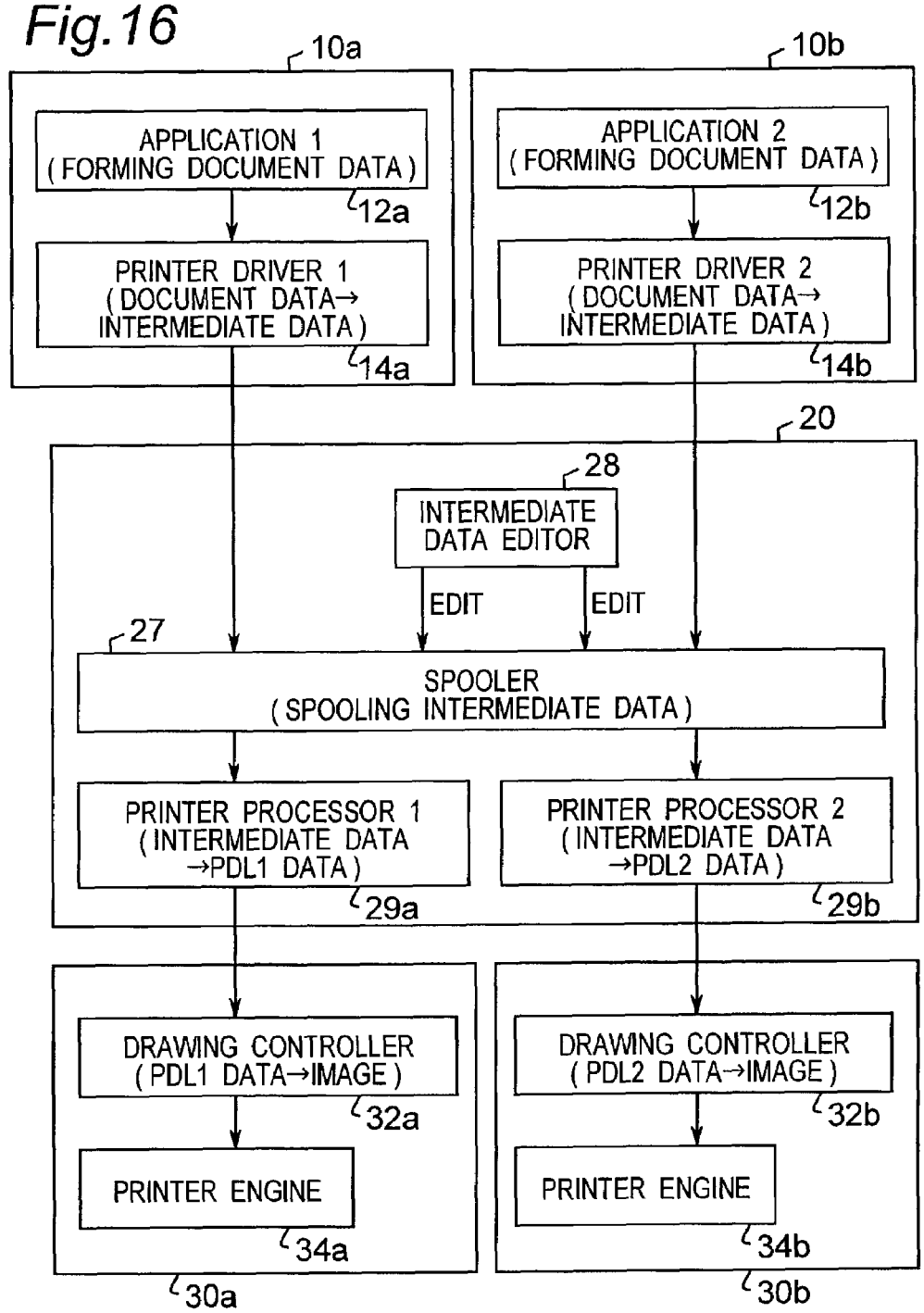
FIG. 16 is a block diagram showing the operation of a data processing system according to third embodiment of the present invention.

A print system according to third embodiment of the present invention will be described. The print system is compared with the print system according to the first embodiment. As shown in the block diagram in FIG. 16, the print system according to the third embodiment is different from the print system according to the first embodiment in that two printers 30a and 30b matched to two different page description languages are connected. The server of the print system has two print processors 1 (29a) and 2 (29b) which convert intermediate data into PDL1 data and PDL2 data described by the two page description languages. In this manner, when a print operation is performed by any one of the printers 30a and 30b, print operations can be performed by the printers 30a and 30b by outputting intermediate data described by the same intermediate language from the clients 10a and 10b to the server 20. A plurality of print processors need not be prepared for the page description languages, and one print processor may perform conversion to the page description languages. The print processor can be realized by a program operated on the server.

Figure 17:
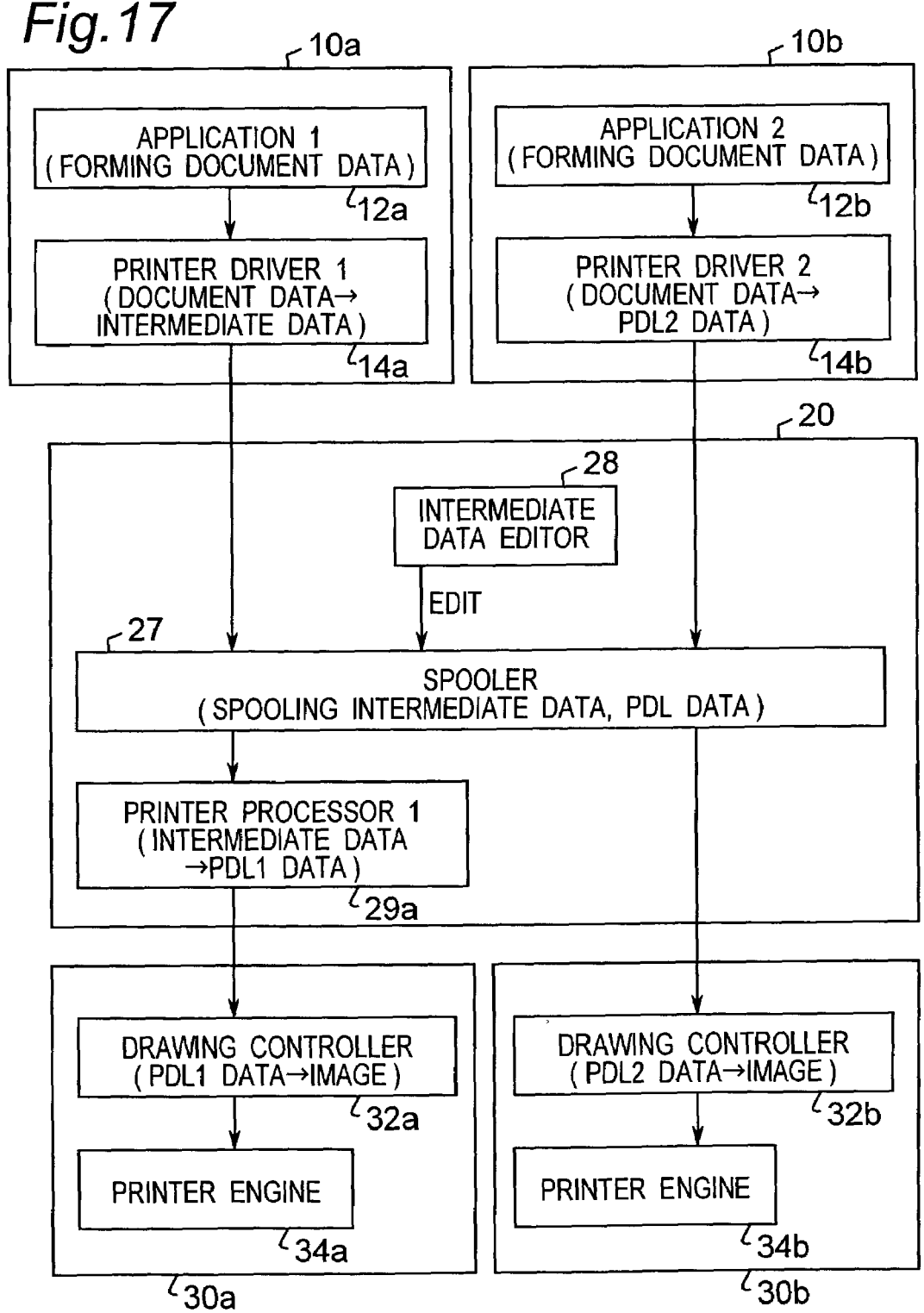
FIG. 17 is a block diagram showing the operation of a data processing system according to fourth embodiment of the present invention.

In addition, a print system according to fourth embodiment of the present invention will be described. This print system is compared with the print system according to the first embodiment. As shown in the block diagram in FIG. 17, the print system according to the fourth embodiment is different from the print system according to the first embodiment in that not only intermediate data, but also PDL data are spooled in a spooler 27 of a server 20. The print system is also different from the print system according to the first embodiment in that, as shown in a spool data list screen in FIG. 19, in selection of data edited by the intermediate data editor 28, a code representing whether data spooled in the spooler 27 of the server is editable by the editor 28 or not can be displayed. In this manner, PDL data from a client 10b having a printer driver 14b directly converting document data or the like generated by an application 12b into PDL data can also be spooled. In this case, when it is displayed whether data spooled in the spooler 27 is editable by the intermediate data editor 28 or not, it can be determined whether each data is intermediate data or not.

Figure 18:
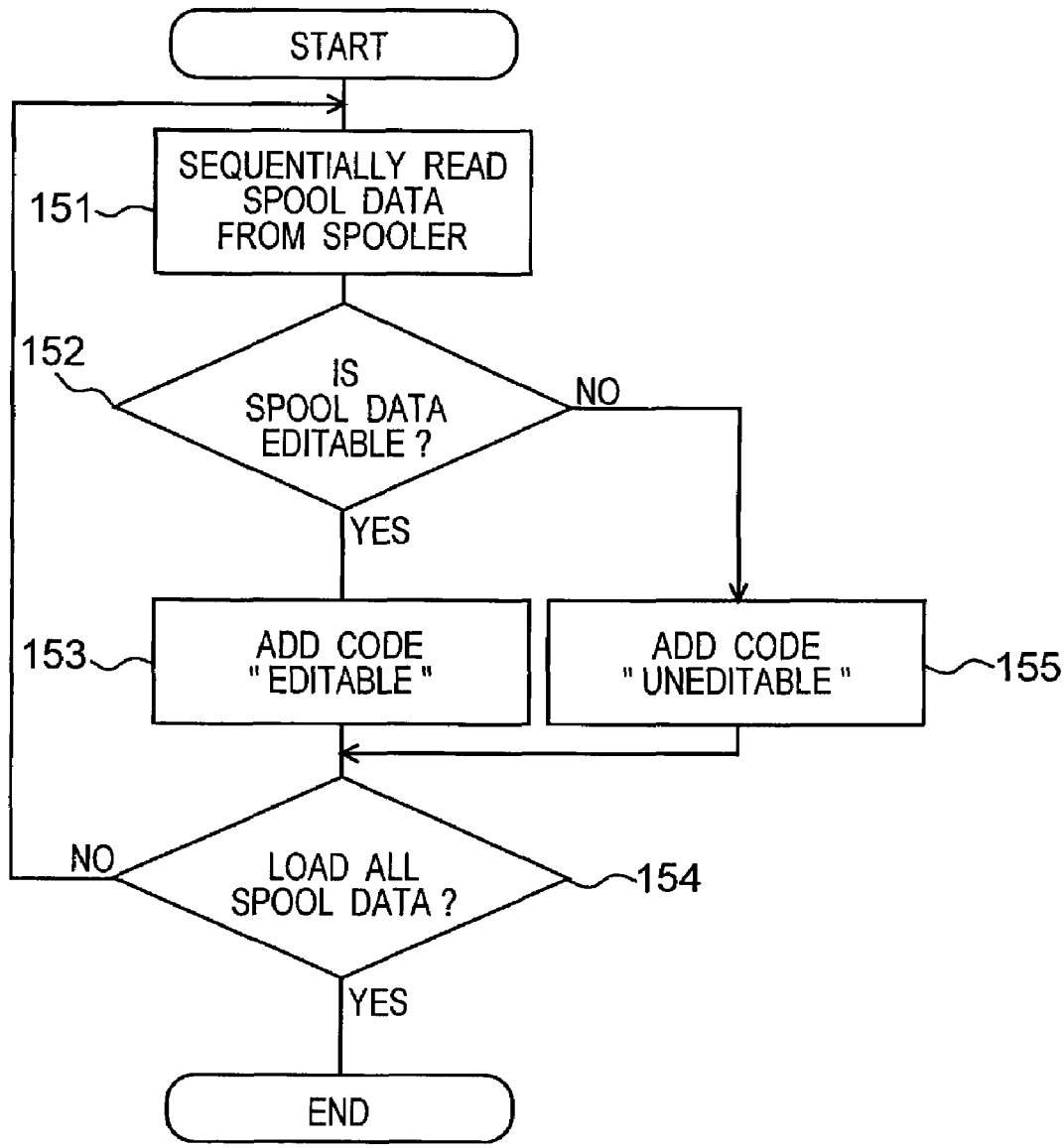
FIG. 18 is a flow chart of display procedure for displaying whether the spooled data in a data processing system is editable or not by the intermediate data editor, according to fourth embodiment of the present invention.

In the server 20 of the print system, by the procedures shown in the flow chart in FIG. 18, it is displayed on the spool data list screen 50 for data spooled in the spooler 27 in FIG. 19 whether the data is editable by the intermediate data editor 28 or not. The procedures in the server 20 of the print system will be described below.

(1) In the server 20, data spooled in the spooler 27 are sequentially read by a CPU 21 or the like serving as a control device (151).

(2) Next, it is decided whether the read data is editable by the intermediate data editor 28 or not (152). This decision can be made by checking whether the pattern identifiers of the read data are intermediate data or not.

(3) When the read data is intermediate data, a code "editable" is added to the data (153).

(4) On the other hand, in the procedure 152, for example, when data 57 in FIG. 19 is data, e.g., PDL data described by a page description language, which cannot be edited, a code "uneditable" is added to the data (155). The code representing whether data is editable or not may be added to each spool data itself. Data representing whether data is editable or not may be recorded on each data as management data generated by the spooler 27.

(5) In any one of the procedure 153 and the procedure 155, next, it is decided that whether all the data spooled in the spooler 27 are read or not (154).

(6) When all the spool data are read, this procedure is ended. On the other hand, all the data are not read, the control flow returns to the procedure 151 to read the spool data.

Consequently, as shown in FIG. 19, on the spool data list screen 50, it can be displayed whether the data spooled in the spooler 27 is editable by the intermediate data editor 28 or not.

A print system according to fifth embodiment of the present invention will be described. This print system is different from the print system according to the first embodiment in that, as shown in the block diagram in FIG. 20, in a spooler 27 of a server 20, print data except for intermediate data of data from clients 10a and 10b is not spooled. In this manner, PDL data which cannot be edited by an intermediate data editor 28 can be excluded.

Furthermore, a print system according to sixth embodiment of the present invention will be described. The print system is different from the print system according to the first embodiment in that, as shown in the block diagram in FIG. 21, when input data is PDL data, a print processor 2 (29b) of a server 20 inversely converts the PDL data into intermediate data, outputs the intermediate data to a spooler 27, and replaced with intermediate data obtained by inversely converting the PDL data spooled in the spooler 27. In this manner, when input data to the server is PDL data except for intermediate data, the PDL data is editable by the intermediate data.

Figure 23:
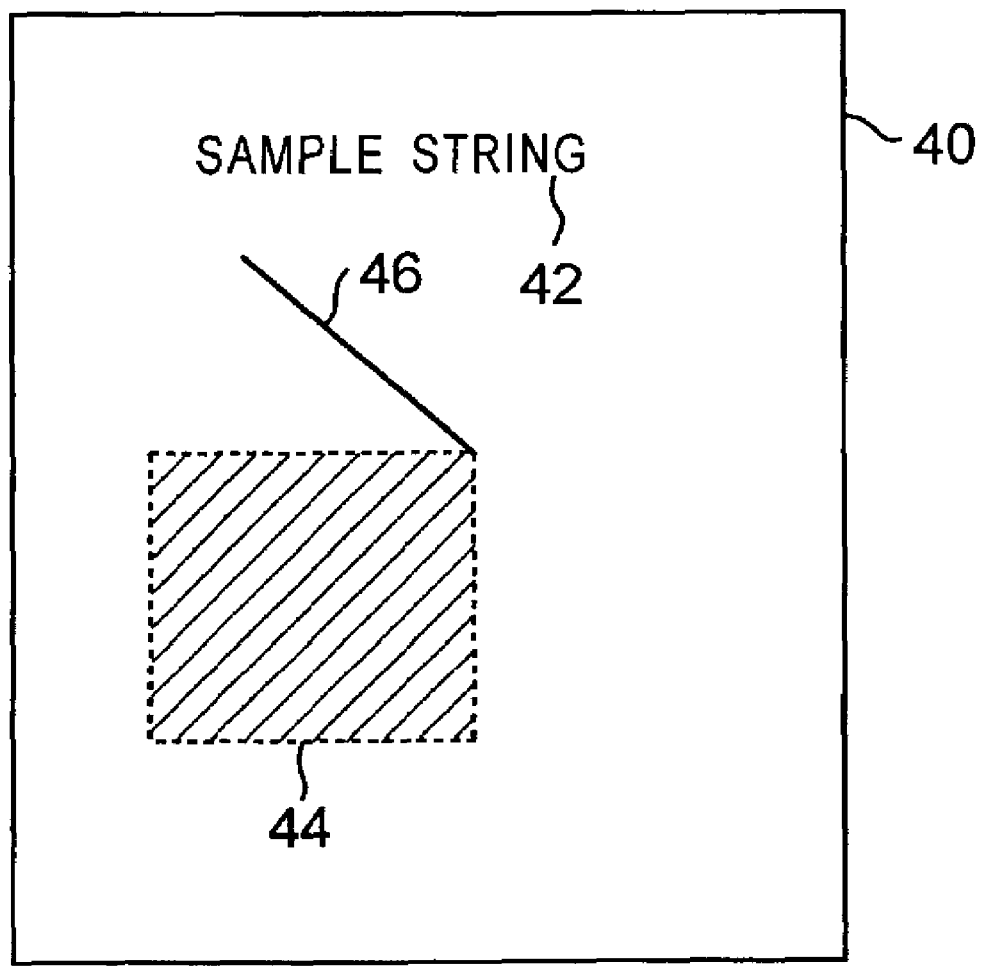
FIG. 23 is an example of a diagram of a screen showing an print image shared by the PDL data in FIG. 22A and the intermediate data in FIG. 22B.

The PDL data and the intermediate data in the print system are different from each other in that, as shown in FIG. 22, the PDL data is described by a page description language, and the intermediate data is described by an intermediate language. On the other hand, as shown in the print image in FIG. 23, the PDL data can also realize the same print image as that realized by the inversely converted intermediate data. Both the PDL data and the intermediate data may be binary data.

Next, an operation in the server 20 of the print system will be described with reference to FIGS. 21 to 24. In the server 20 of the print system, when input data from the client 10 is PDL data but intermediate data, the PDL data is editable by an intermediate data editor by the following procedures.

(1) When PDL2 data is received from a printer driver 2 (14b) of a client 10b is received by the server 20, the PDL2 data is spooled in the spooler 27.

(2) The PDL2 data is sent from the spooler 27 to a print processor.

(3) In the print processor, it is decided whether the input data is PDL data or not (161).

(4) When the input data is PDL data, the PDL data is output to a transmitting device 26b without any change (162), and is printed by a printer 30.

(5) Then, in a print processor 29b, the PDL data is inversely converted into intermediate data described by an intermediate language (163).

(6) The inversely converted intermediate data is output from the print processor 29 to the spooler 27 (164).

(7) Then, in the spooler 27, the spooled PDL data is replaced with intermediate data (165). At this time, a code "printed" is added to the intermediate data used in the replacement.

(8) On the other hand, in the above procedure 161, when the input data to the print processor 29 is not PDL data, the input data is converted into PDL data (166).

(9) Then, the PDL data is output to the transmitting device 26b (167), and is printed by the printer 30.

(10) Thereafter, as described in first embodiment, when print contents include an error, as shown in the block diagram in FIG. 21, the intermediate data spooled in the spooler 27 is editable by the intermediate data editor 28.

The data processing apparatus according to the above structure includes a spooling device spooling intermediate data which has not been converted into print data, and an intermediate data editor editing the intermediate data. In this manner, when the printed intermediate data has an error, the intermediate data is editable on the data processing apparatus without starting an application, and the error of the intermediate data is corrected, so that the intermediate data can be rapidly re-printed.

Also, according to the data processing apparatus of the above structure, when input data is data except for intermediate data, the print data conversion device outputs the input data to the printer, inversely converts the input data into intermediate data described by an intermediate language, and outputs the intermediate data to the spooling device. Then, the spooling device replaces the spooled input data with intermediate data. In this manner, when the input data to the data processing apparatus is data except for intermediate data, the input data is editable.

Furthermore, according to the data processing apparatus of the above structure, printed intermediate data is spooled by the spooling device, and the data editing device makes an editing operation possible by using the intermediate data but print data itself. In this manner, a load of coping with a plurality of page description languages in a client can be canceled. Also, a client using a printer driver corresponding to the conversion into the intermediate data described by an intermediate language can be used.

The printer according to the above structure includes a spooling device spooling intermediate data which has not been converted into print data near the printer, and an intermediate data editing device editing the intermediate data. In this manner, even though the print data has an error, the intermediate data spooled near the printer is edited, and the data can be rapidly re-printed. Therefore, document data or the like need not be corrected by an application which generates the document data or the like.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A data processing apparatus comprising:
   a receiving device receiving intermediate data which is converted from data generated by an application, the intermediate data to be converted into print data, the print data to be printed by a printer;
   a storage device;
   a spooler spooling the intermediate data in said storage device, the intermediate data of the print data being spooled even after the print data is transmitted;
   an editor editing the intermediate data spooled in said storage device;
   an acquiring device acquiring an instruction of data re-editing by a user;
   a print data converter converting the intermediate data into the print data;
   a transmitting device transmitting the print data to the printer; and
   a controller, which controls said editor to edit the intermediate data spooled in said storage device after the print data thereof is printed according to said instruction, and controls said converter to convert the edited intermediate data to the print data, and controls said transmitting device to retransmit the print data to the printer.

2. A data processing apparatus according to claim 1, wherein the intermediate data is described by an intermediate language.

3. A data processing apparatus according to claim 1, wherein said editor comprises a text data editor editing data on a text data in the intermediate data.

4. A data processing apparatus according to claim 1, wherein said editor comprises a bitmap data editor editing data on a bitmap data in the intermediate data.

5. A data processing apparatus according to claim 1, wherein said editor comprises a line data editor editing data on a line in the intermediate data.

6. A data processing apparatus according to claim 1, wherein said spooler stores codes for each spooled data representing whether each spooled data is editable by said editor.

7. A data processing apparatus according to claim 1, wherein not said print data converter outputs input data other than intermediate data to said transmitting device and converts the input data to intermediate data described by an intermediate language and output the intermediate data to said spooler, and
   said spooler replaces the spooled input data with the intermediate data.

8. A data processing apparatus according to claim 1, wherein, when the print data has been printed, a code is added to the intermediate data in correspondence to the print data spooled in said storage device the addition of a code to represent that the print data was printed.

9. A data processing apparatus according to claim 1, wherein, when the intermediate data has been edited by said editor, the edited intermediate data is spooled in the storage device with a code representing that print is waited.

10. A data processing apparatus according to claim 1, further comprising a display controller displaying a list of a plurality of intermediate data stored in said storage device on a device.

11. A data processing apparatus according to claim 1, further comprising a drawing controller converting the print data to bitmap image.

12. A data processing apparatus according to claim 1, wherein said storage device stores the intermediate data before being transmitted to said printer, with a code representing that is print waited.

13. A data processing apparatus according to claim 1, wherein said converter can convert the intermediate data to one of two different types of print data.

14. A data processing apparatus according to claim 1, wherein said storage device further spools the print data, wherein the intermediate data spooled in said storage device has a code representing that edition is possible, and the print data that edition is not possible spooled in said storage device has a code representing uneditable.

15. A print system comprising:
    a receiving device receiving intermediate data which is converted from data generated by an application, the intermediate data to be converted into print data, the print data to be printed by a printer;
    a storage device;
    a spooler spooling the intermediate data in said storage device, the intermediate data of the print data being spooled even after the print data is transmitted;
    an editor editing the intermediate data spooled in said storage device;
    an acquiring device acquiring an instruction of data re-editing by a user;
    a print data converter converting the intermediate data into the print data;
    a drawing controller converting said print data into a bitmap image;
    a printer engine performing a print process on the basis of said bitmap image; and
    a controller which controls said editor to edit the intermediate data spooled in said storage device after the print data thereof is printed according to said instruction, and controls to re-print the intermediate data edited by use of said drawing controller and said print engine.

16. A data processing method comprising the steps of:
    receiving intermediate data which is converted from data generated by an application, the intermediate data to be converted into print data, the print data to be printed by a printer;
    converting the intermediate data into print data;
    transmitting the print data to the printer;
    spooling the intermediate data in a storage device, the intermediate data of the print data being spooled even after the print data is transmitted;
    acquiring an instruction of data re-editing by a user;
    starting an editor editing the intermediate data spooled in the storage device according to said instruction; and
    re-transmitting the print data re-converted from the edited intermediate data to the printer.

17. A computer program embodied on a computer-readable medium for processing data, the computer program comprising the steps of:
    receiving intermediate data which is converted from data generated by an application, the intermediate data to be converted into print data, the print data to be printed by a printer;

converting the intermediate data into print data;
transmitting the print data to the printer;
spooling the intermediate data in a storage device, the intermediate data of the print data being spooled even after the print data is transmitted;
acquiring an instruction of data re-editing by a user;
starting an editor editing the intermediate data spooled in the storage device according to said instruction; and
re-transmitting the print data re-converted from the edited intermediate data to the printer.

* * * * *